Jan. 18, 1938.   McKINLEY PALMER   2,105,496
VACUUM OPERATED DEVICE
Filed Jan. 21, 1935   3 Sheets-Sheet 1
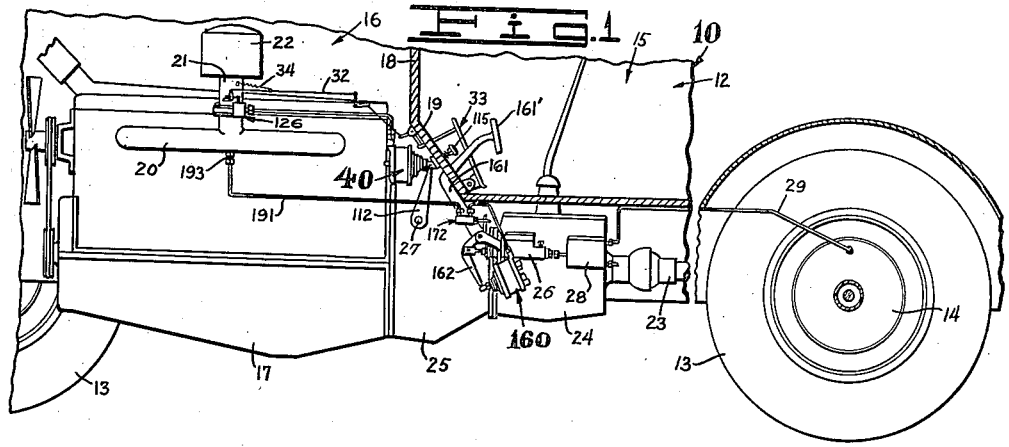
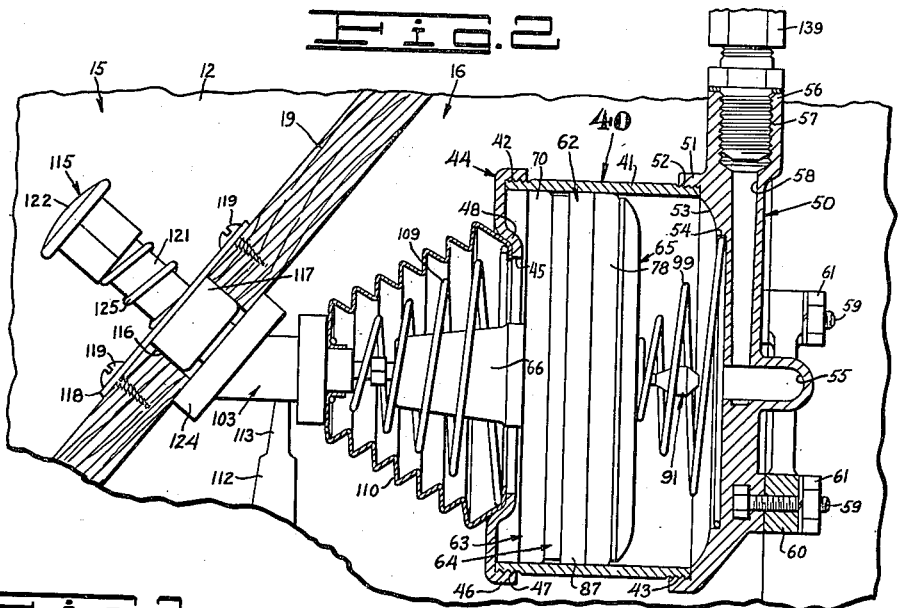
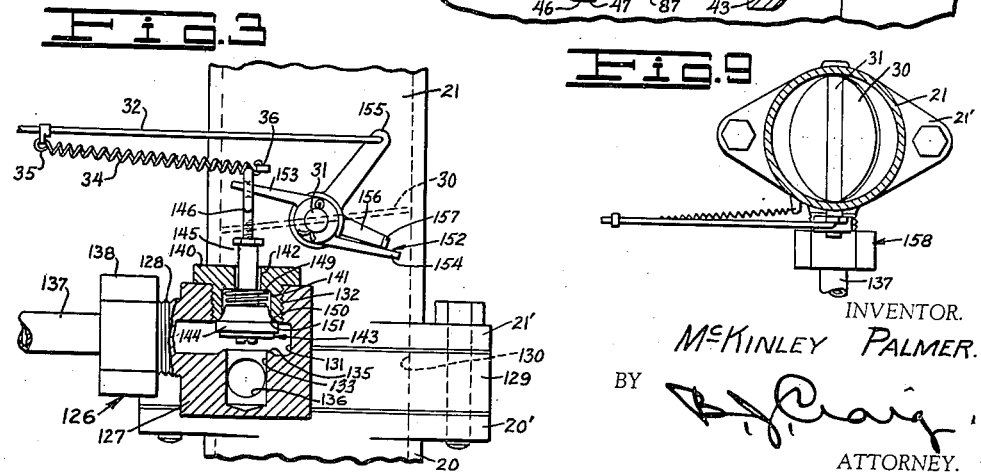
INVENTOR.
McKINLEY PALMER.
BY
ATTORNEY.

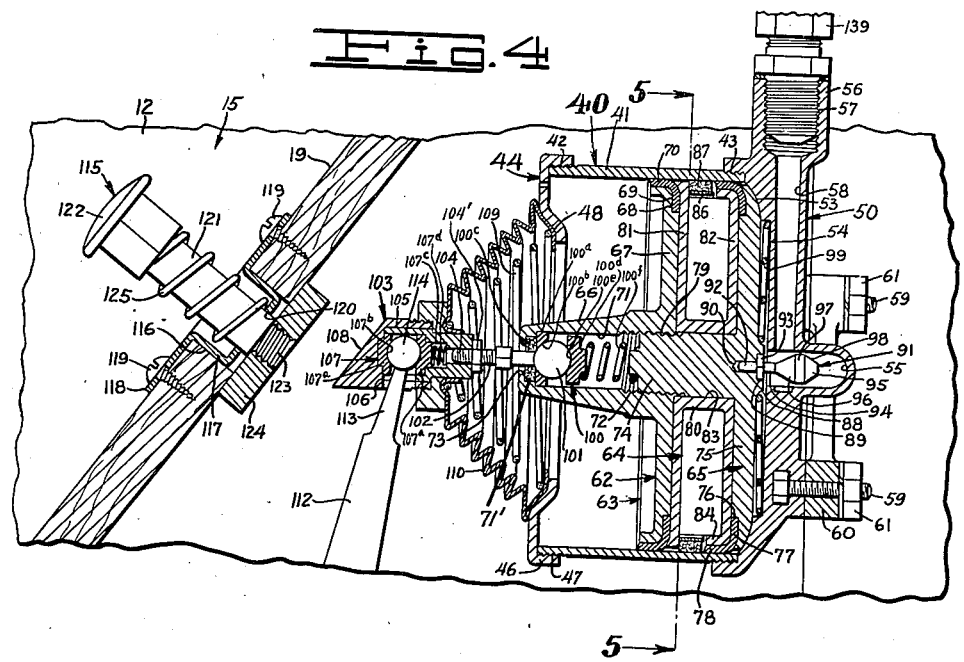
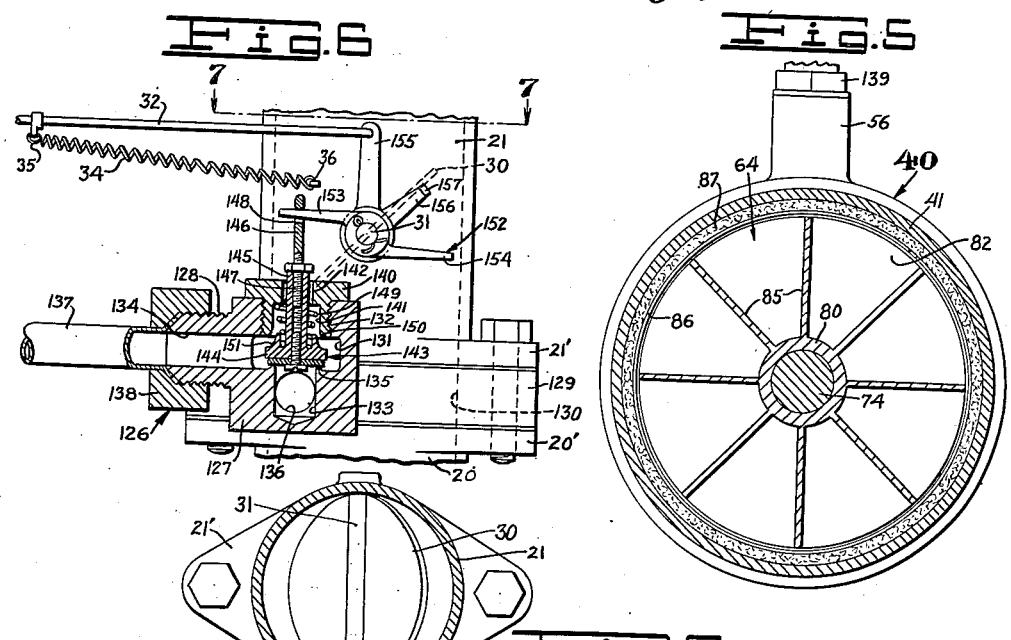
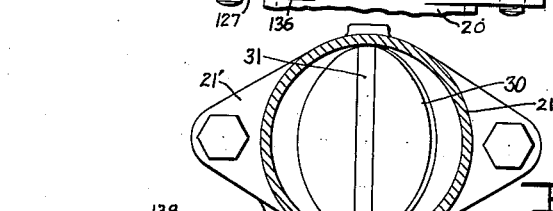

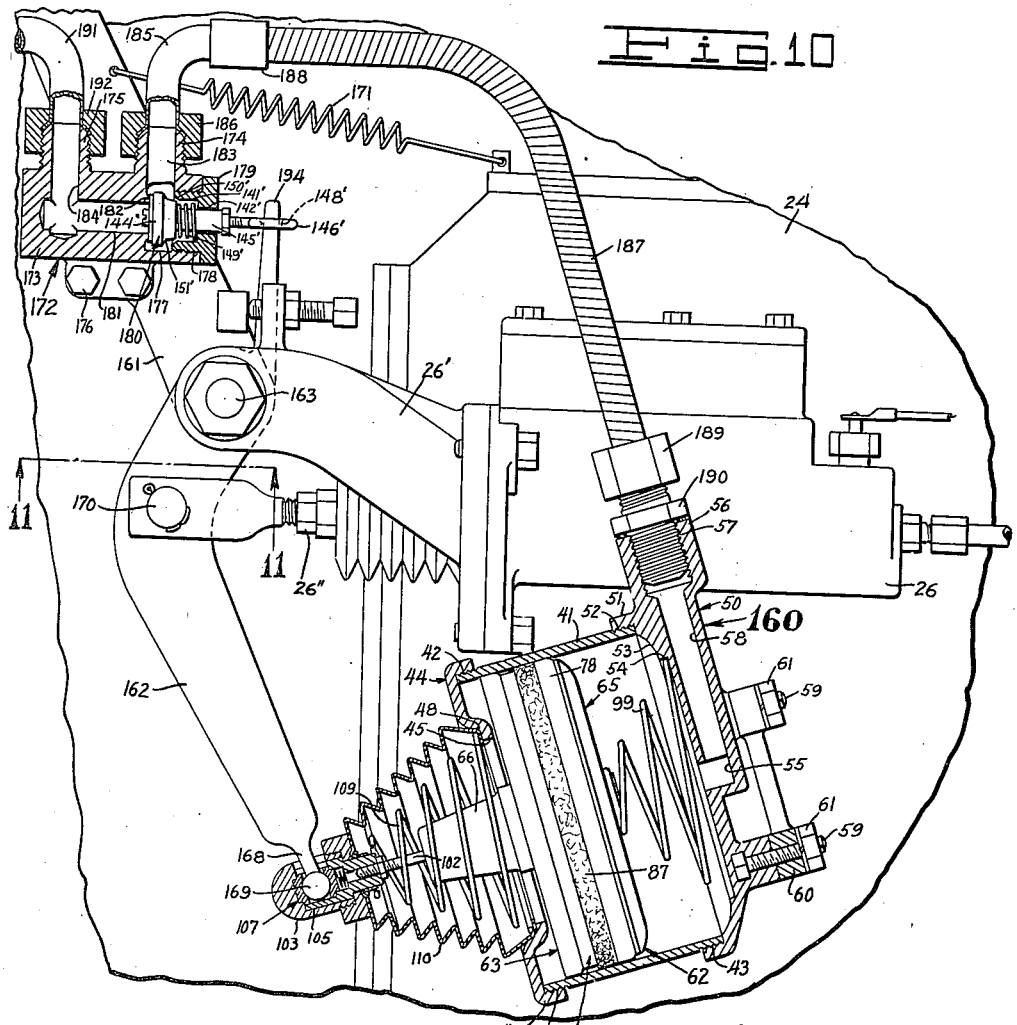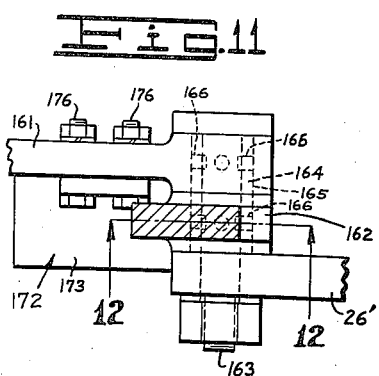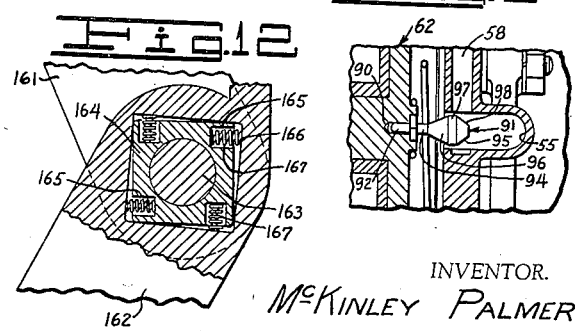

Patented Jan. 18, 1938

2,105,496

UNITED STATES PATENT OFFICE 2,105,496

VACUUM OPERATED DEVICE

McKinley Palmer, Los Angeles, Calif.

Application January 21, 1935, Serial No. 2,662

10 Claims. (Cl. 192—.01)

This invention relates to improvements in vacuum operated devices.

The general object of the invention is to provide an improved vacuum operated device for actuating mechanisms, such as used in connection with automobiles, locomotives, airplanes and more particularly for actuating the clutch of an automobile or the brake operating device of an automobile.

A still further object of my invention is to provide a novel actuator including an improved valve mechanism.

Other objects and the advantages of this invention will be apparent from the following description taken in connection with the accompanying drawings wherein;

Fig. 1 is a fragmentary vertical longitudinal section through an automobile embodying the features of my invention;

Fig. 2 is an enlarged vertical section through my improved vacuum operated device for actuating the clutch of the automobile shown in Fig. 1;

Fig. 3 is an enlarged fragmentary side elevation of the carburetor manifold of the automobile shown in Fig. 1 and shows a control valve for the vacuum operated device;

Fig. 4 is a view similar to Fig. 2 showing the vacuum operated device as actuated to a position to release the clutch of the automobile;

Fig. 5 is a section taken on line 5—5 of Fig. 4;

Fig. 6 is a view similar to Fig. 3 showing another position of the valve;

Fig. 7 is a section taken on line 7—7 of Fig. 6;

Fig. 8 is a fragmentary view similar to Fig. 2 showing a portion of the device as it is in the act of operating;

Fig. 9 is a view similar to Fig. 7 showing another form of connecting means;

Fig. 10 is an enlarged fragmentary elevation of a portion of the automobile shown in Fig. 1 showing the vacuum operated device for actuating the brake operating means of the automobile;

Fig. 11 is a section taken on line 11—11 of Fig. 10; and,

Fig. 12 is an enlarged fragmentary section taken on line 12—12 of Fig. 11.

In the accompanying drawings I have shown my improved vacuum operated device as operatively installed on an automobile which is indicated generally at 10 in Fig. 1. The automobile 10 may be of any desired type including a body 12 mounted on wheels 13 having associated brakes 14 which in this instance are shown as of the hydraulic type. The body 12 includes an operator's compartment 15 and an engine compartment 16 in which is positioned any type of internal combustion engine 17. The driver's compartment and engine compartment are separated by a transverse partition 18 which includes an inclined foot portion 19.

The engine 17 includes the usual fuel intake manifold 20 which communicates with the outlet manifold 21 of a carburetor 22. The engine 17 is adapted to drive the usual drive shaft 23 through the medium of transmission mechanism, the housing of which is indicated at 24 and the usual clutch mechanism, the housing of which is indicated at 25. As shown the clutch includes an operating shaft 27 which extends out of the housing 25. Mounted on the transmission housing 24 is shown a standard type hydraulic brake operating device 26 which operates the brakes through a distributor 28 from which pipes 29 extend to the brake devices 14.

The carburetor outlet manifold 21 has the usual butterfly valve 30 therein mounted on the usual shaft 31 which extends out of the manifold (see Figs. 3-6 and 7). The automobile includes a throttle rod 32 which is actuated by a foot accelerator device 33 in the driver's compartment. The throttle rod 32 is shown as resiliently urged in one direction by a coiled spring 34 one end of which is connected to the rod as at 35 and the opposite end of which is anchored to the carburetor outlet manifold as at 36.

In the accompanying drawings, I have indicated my vacuum operated clutch actuating device generally at 40. The device 40 includes a hollow cylindrical body portion 41 which is externally threaded at each end, as indicated at 42 and 43. On one end of the body or cylinder 41 I provide a cap 44 having an aperture 45 therein and including a flange portion 46 which is threaded as at 47 to engage the threads 42 on the cylinder 41. Adjacent the aperture 45 the cap 44 is formed concave as indicated at 48. On the opposite end of the cylinder 41 I provide a cap 50 which includes a flange portion 51 having internal threads 52 which engage the threads 43 of the cylinder 41.

The inner face of the cap 50 has a recess 53 therein the outer edge of which is of approximately the same diameter as the inside of the cylinder 41. The cap 50 further includes a reduced recess 54 which opens into the recess 53 and a much greater reduced coaxial elongated recess or valve chamber 55.

At one side the cap 50 includes a boss 56 having a threaded recess 57 therein with which one end of an aperture 58 communicates. The opposite end of the aperture 58 communicates with the valve chamber 55. The aperture 58 is positioned at right angles to the chamber 55 and the end of the aperture 58 where it opens into the chamber 55 is preferably of less diameter than the opposite end.

Embedded in the cap 50 and extending therefrom I provide a plurality of bolts 59 for clamping the device 40 to a bracket 60 by nuts 61. The bracket 60 may be mounted on a portion of the engine or the automobile frame adjacent the clutch in any desired manner.

Positioned in the cylinder 41 I provide a piston member which I have indicated generally at 62. As shown the piston includes a front member 63 an intermediate member 64 and a rear member 65. The front portion 63 includes a hub portion 66 and an enlarged flange portion 67 having a recess 68 in the face thereof opposite the hub portion. The recess 68 opens through the periphery of the flange 67 and has a packing ring 69 positioned therein which includes a skirt portion 70 which overlays the outer edge of the flange.

The hub portion 66 has a recess 71 therein which includes a threaded section 72 adjacent the flange end and the opposite end of the hub has a reduced recess 71' and a reduced aperture 73 therein which communicates with the recess 71'.

The rear portion 65 of the piston includes a hub portion 74 and an enlarged flange portion 75 having a recess 76 in the face thereof towards the hub portion. The recess 76 opens through the periphery of the flange 75 and has a packing ring 77 positioned therein which includes a skirt portion 78 directed towards the hub portion. The hub 74 of the rear piston member is threaded as at 79 to engage the threads 72 of the front piston member. The front and rear piston members are spaced apart by the intermediate member 64 which includes a hub portion 80 and spaced front and rear enlarged plate portions 81 and 82, respectively. The hub portion 80 has an aperture 83 therein in which the hub 74 of the rear piston member is positioned. The front plate 81 extends outward and overlays the packing ring 69 of the front piston member while the rear flange 82 includes a skirt portion 84, the outer face of which is engaged by the skirt 78 of the packing ring 77 of the rear piston member.

The front and rear flanges 81 and 82 and the hub 80 of the intermediate member are all connected by a plurality of radially extending integral ribs 85 (see Fig. 5). The ribs 85 extend outward only as far as the inner face of the skirt portion 84 of the rear plate 82. Surrounding the ribs 85 between the plates 81 and 82 I provide a flat spring ring 86 and surrounding the spring ring 86 I provide a felt ring 87 which is adapted to be saturated with a lubricant, such as neat's foot oil.

The rear face of the rear piston member 65 has a slightly protruding boss 88 thereon which has a polygonal recess 89 therein and the hub portion 74 has a reduced recess 90 therein which communicates with the recess.

Mounted on the rear member 65 of the piston I provide a valve member indicated generally at 91. As shown the valve member includes a stem portion 92 which is driven into the recess 90 and an enlarged polygonal portion 93 which is positioned in the polygonal recess 89. The valve 91 further includes a shank portion 94 extending rearward from the piston and an enlarged head portion 95 which includes a frusto-conical front section 96 an annular intermediate section 97 and a frusto-conical rear section 98.

Positioned in the cylinder 41 between the rear cap 50 thereof and the piston I provide a conical spring 99 the base of which is positioned in the cap recess 54 and the opposite end of the spring surrounds the piston boss 88. The spring 99 normally urges the piston 62 towards the front cap 44 to the position shown in Fig. 2.

Positioned in the recess 71 of the piston I provide a ball socket indicated generally at 100 which is adapted to engage a ball member 101. As shown the socket 100 includes a washer member 100a having an aperture 100b the side walls of which are shaped to fit the ball 101. The washer 100a abuts the bottom of the recess 71 and in the recess 71' I provide a felt packing washer 100c. Opposite the washer 100 I provide a plate member 100d having a concave recess 100e therein in which the ball 101 is positioned. Positioned in the recess 71 between the plate member 100d and the end of the hub 74 I provide a coiled spring 100f.

The ball member 101 includes a shank 102 which extends out of the hub through the aperture 73 and is suitably secured to a head member 103 as by threaded engagement therewith as indicated at 104 and is locked in position by a nut 104'. The head member 103 has a recess 105 therein and an aperture 106 therein which communicates with the recess 105. Positioned in the recess 105 I provide a ball socket which is indicated generally at 107. The end of the head 103 opposite the shank 102 includes an inclined working face 108.

The socket member 107 includes a pair of spaced plates 107a one of which is movable in the recess 105. Each of the plates 107a have a concave recess 107b in one face thereof and the plates are positioned with the recesses 107b facing towards each other. The head 103 includes a reduced recess 107c which communicates with the recess 105. Positioned in the recess 107c I provide a coiled spring 107d one end of which engages the bottom of the recess 107c and the other end engages the movable plate 107a and resiliently urges it towards the other plate.

Positioned between the front cap 44 and the head member 103 I provide a conical spring 109, the base of which is positioned in the concave recess 48 of the cap and the opposite end of which engages the head member 103. The spring 109 like the spring 99 resiliently urges the piston 41 towards the front cap 44.

Positioned over the spring 109 between the cap 44 and the head member 103 I preferably provide a corrugated flexible dust cover or boot 110, one end of which may be held in position by the base of the spring 109 clamping it to the cap 44 and the opposite end by the small end of the spring clamping it to the head member 103.

Mounted on and suitably secured to the clutch actuating shaft I provide an operating arm 112 which includes a reduced portion 113 having a ball member 114 thereon. The reduced portion 113 of the operating arm 112 is positioned in the head aperture 106 and the ball member 114 is positioned in the ball socket 107 of the head member between the plates 107a with the surfaces of the concave recesses 107b engaging the ball.

In the floor board 19 of the automobile adjacent the device 40 I provide a manually actuated device 115 for manually moving the piston 62. As shown the floor board 19 has an aperture 116 thereon in which a cup member 117 is positioned opening into the operator's compartment 15 and having an enlarged flange 118 thereon which is secured to the floor board by screws 119. The cup member 117 has an aperture 120 therein in which a rod 121 is positioned. In the operator's compartment the rod 121 has an enlarged head 122 thereon and the opposite end of the rod includes a reduced threaded portion 123 on which an enlarged nut member 124 is positioned. Surrounding the rod 121 between the bottom of the cup member and the head 122 I provide a coiled spring 125 which resiliently urges the rod 121 towards the operator's compartment.

Interposed between the fuel intake manifold 20 and the carburetor outlet manifold 21 I provide a valve member indicated generally at 126 (see Figs. 3-6 and 7). As shown the valve member 126 includes a body portion 127 having an externally threaded boss 128 extending therefrom and an integral insert plate portion 129. As shown in Figs. 6 and 7 the insert plate 129 has the same shape as that of the connecting flanges 20' and 21' of the intake manifold 20 and the carburetor manifold 21 between which it is positioned. Furthermore, the insert plate 129 has an aperture 130 therein of the same size as the interior of the manifolds 20 and 21.

The valve body 127 has a chamber 131 therein and a threaded aperture 132 which opens through the top of the body and communicates with the chamber 131. The body 127 has a reduced recess 133 therein which is coaxial with the threaded aperture 132 and opens into the chamber 131 and an aperture 134 which is positioned at right angles to the chamber 131 with one end opening thereinto and the opposite end opening through the outer end of the threaded boss 128. Surrounding the recess 133 the body 127 includes a raised seat portion 135. The body 127 and the plate portion 129 have an aperture 136 therein one end of which opens into the plate aperture 130 and the opposite end into the recess 133.

One end of a conduit member 137 is suitably secured to the threaded boss 128 of the valve 126 by a coupling member 138 and the opposite end of the conduit 137 is suitably connected to a coupling member 139 which is positioned in the threaded recess 57 of the boss 56 of the device 40.

Positioned in the threaded aperture 132 of the valve body 127 I provide a nut member 140 which has a recess 141 therein opening through the bottom thereof and a reduced aperture 142 which communicates with the recess 141 and opens through the top of the nut member.

Positioned in the chamber 131 I provide a valve member 143 which includes a head portion 144 having a reduced shank 145 extending therefrom which is positioned in the aperture 142 of the nut member 140. The valve shank 145 is of slightly less diameter than the diameter of the nut aperture 142 to allow passage of air through the aperture 142 into the chamber 131. Extending upward from the shank 145 I provide a stem member 146 one end of which is threaded into the shank 145 and the opposite end of which is flared out and has an aperture 148 therein.

Positioned in the recess 141 of the nut member 140 and surrounding the valve shank 145 between the valve head 144 and the bottom of the recess 141 I provide a coiled spring 149. The spring 149 resiliently urges the valve head 144 into engagement with the valve seat 135 to cut off passageway from the recess 133 into the chamber 131.

The lower end of the nut member includes a seat portion 150 and the upper portion of the valve head 144 includes a seat portion 151 so that when the valve is moved upward against the action of the spring 149 into engagement with the nut 140 the valve seat 151 engages the nut seat 150 and restricts passage of air through the nut aperture 142 into the chamber 131.

Loosely mounted on the butterfly valve shaft 31 I provide a rocker member 152 which includes an arm 153 extending from one side of the shaft and an arm 154 extending from the opposite side of the shaft. The arm 153 is positioned in the aperture 148 of the valve stem 146.

Mounted on and suitably secured to the butterfly valve shaft 31 between the manifold and the rocker member 152 I provide an operating arm 155 to which the throttle rod 32 is connected in the usual manner. Extending outward from the operating arm 155 in the same direction as the arm 154 of the rocker member 152 I provide an arm 156 which is bent at right angles adjacent its outer end to form a finger portion 157 which is adapted to engage the upper edge of the rocker arm 154.

The arm 156 is arranged so that when the butterfly valve 30 is in a closed position to restrict passageway through the manifold 21 the finger 157 engages the rocker arm 154 and holds it down thereby retaining the rocker arm 153 in raised position which in turn retains the valve 143 in a raised position as shown in Fig. 3. When the butterfly valve operating arm 155 is moved to open the butterfly valve 30 to open the passageway through the manifold 21, the finger 157 of the arm 156 moves out of engagement with the rocker arm 154 whereupon the spring 149 moves the valve member 143 downward as shown in Fig. 6.

The operation of the device 40 is as follows. The operator of the automobile 10 starts the engine 17 which as it draws fuel from the carburetor 22 forms a suction in the manifolds 20 and 21 when the butterfly valve 30 is open. The idling fuel is directed to the engine in the usual manner when the butterfly valve is closed. After the engine has warmed up the operator allows the spring 34 to close the butterfly valve 30 whereupon the valve 143 is moved upward to the position shown in Fig. 3 as previously described. Suction is then formed in the conduit 137 and in the cylinder 41 which draws the piston 62 towards the rear cap 50 to the position shown in Fig. 4. As the piston 62 is thus moved the head member 103 moves with it and in turn swings the clutch operating arm 112 about the axis of the shaft 27 thereby rotating the shaft 27 to actuate the clutch to a disengaged position. Thereafter the operator may shift the transmission gears from the neutral position to any position desired.

When the piston 62 is in this release position the piston valve member 91 is positioned in the valve chamber 55 of the cap with the annular portion 97 thereof at the rear of the aperture 58 as shown in Fig. 4.

After shifting gears the operator steps on the accelerator pedal 23 and opens the butterfly valve 30 to allow the engine to draw more fuel thereto. When the butterfly valve 30 is opened the finger 157 of the arm 156 moves out of engagement with the rocker arm 154 whereupon the valve 143 moves downward to restrict passageway between the chamber 131 and the recess 133, as previously described whereafter there is no suction in the conduit 137 and cylinder 41 whereupon the clutch spring and the springs 99 and 109 of the device 40 move the piston 62 towards the front cap 44 whereupon the clutch moves into engagement to transmit power from the engine to the transmission.

When the valve 143 moves downward disengaging the seats 150 and 151 air enters the conduit 137 to break the vacuum therein through the nut aperture 142 of the valve device 126.

The piston valve member 91 is so arranged that when the suction is first discontinued the piston 62 will move forward fast until the annular portion 97 of the valve 91 moves to a position adjacent the forward side of the aperture 58 as shown in Fig. 8. When the valve 91 is in this position less air can enter the piston from the chamber 55 thereby causing the speed of the piston to decrease. This action occurs at the time the clutch plates are in the act of engaging. Upon continued movement of the piston 62 the annular portion 97 of the valve 91 moves out of the valve chamber 55 whereupon the speed of the piston increases until it reaches the forward position, as shown in Fig. 2.

If it is desired to start the engine when the transmission is in "gear" or if for any reason it is desired to manually actuate the clutch to a release position the operator steps on the head 122 of the rod 121 and moves the rod towards the engine compartment and as the rod 121 is thus actuated the nut head 124 thereon engages the head member 103 of the device 40 and upon continued movement moves the piston 62 rearward and swings the clutch operating arm 112 to actuate the clutch to a disengaged position. When the operator removes his foot from the rod 121 the spring 125 returns the rod to its initial position and the clutch springs and the springs 99 and 109 return the piston 62 to its initial position.

In some instances it may not be desirable to use the valve device 126 whereupon as shown in Fig. 9 the conduit 137 may be tapped or coupled directly into either the conduit 20 or 21 intermediate the butterfly valve 30 and the engine 17, as indicated at 158.

In Fig. 10 I have indicated my vacuum operated brake operating device generally at 160. As shown the device 160 is the same as the device 40 in all respects except that the piston valve 91 is omitted and the various parts thereof are indicated by similar reference numerals. When the device 160 is used to actuate the brake operating device 26 the usual foot brake lever is removed and a foot brake lever 161 and an operating lever 162 substituted therefor. As shown in Figs. 11 and 12 a stationary stud shaft 163 is mounted on the bracket 26' of the brake operating member 26 and rotatably positioned on the shaft 163 I provide a sleeve 164 which is square in cross-section. Each of the levers 161 and 162 have a square aperture 165 therein in which the square sleeve 164 is positioned. The cross sectional area of the apertures 165 in the levers is slightly greater than the cross sectional area of the sleeve 164 so that the levers can rock a predetermined amount on the sleeve without rotating the sleeve on the shaft 163. Intermediate the width of each of the levers 161 and 162 the sleeve has an aperture 166 in each face thereof in which a coiled spring 167 is positioned.

The lower end of the lever 162 includes a reduced portion 168 having a ball member 169 thereon. The reduced portion 168 of the lever 162 is positioned in the aperture 106 of the head member 103 and the ball member 169 is engaged by the ball socket 107 of the head member.

Adjacent the shaft 163 the lever 162 is pivotally connected to the operating rod 26" of the brake operating member 26 in the usual manner as indicated at 170.

The brake foot lever 161 is shown as resiliently retained in a normal or inoperative position by a coiled spring 171 one end of which is suitably connected to the lever and the opposite end anchored to the transmission housing 24.

Mounted on the brake foot lever 161 I provide a valve device indicated generally at 172. As shown the valve device 172 includes a body portion 173 which has a pair of spaced externally threaded bosses 174 and 175 extending therefrom and is secured to the lever 161 by a plurality of bolts and nuts 176. The body 173 has a chamber 177 therein and a threaded aperture 178, one end of which communicates with the chamber 177 and the opposite end opens out of the body. Positioned in the threaded aperture 178 I provide a nut member 179 which is similar to the nut member 140 of the valve device 126. This nut member has a recess 141' therein opening through the bottom thereof and a reduced aperture 142' which communicates with the recess 141' and opens through the top of the nut member.

Positioned in the chamber 177 I provide a valve member 180 which is similar to the valve member 143 of the device 126 and which includes a head portion 144' having a reduced shank 145' extending therefrom which is positioned in the aperture 142' of the nut member 179. The valve shank 145' is of slightly less diameter than the diameter of the nut aperture 142' to allow passage of air through the aperture 142' into the chamber 177. Extending upward from the shank 145' I provide a stem member 146' one end of which is threaded into the shank 145' and the opposite end of which is flared out and has an aperture 148' therein. The body 173 further includes a recess 181 one end of which opens into the chamber 177 where it has a seat portion 182 therearound, and a pair of spaced apertures 183 and 184. One end of the aperture 183 opens into the chamber 177 and the opposite end opens through the end of the threaded boss 174. One end of the aperture 184 opens into the recess 181 and the opposite end opens through the end of the threaded boss 175. Positioned in the recess 141' of the nut member 179 and surrounding the valve shank 145' between the valve head 144' and the bottom of the recess 141' I provide a coiled spring 149'. The spring 149' resiliently urges the valve head 144' into engagement with the valve seat 182 to cut off passageway from the recess 181 into the chamber 177.

A conduit 185 is connected to the threaded boss 174 by a suitable coupling member 186 and one end of an armored flexible conduit member 187 is suitably connected to the conduit 185, as indicated at 188. The opposite end of the flexible conduit is connected as at 189 to a suitable coupling member 190 which is positioned in the threaded recess 57 of the device 160.

One end of a conduit 191 is connected to the threaded boss 175 of the device 172 by a suitable coupling member 192 and the opposite end of the conduit communicates with the interior of the manifold 20 through a suitable coupling member 193 (see Fig. 1).

The lever 162 includes an upwardly extending arm 194 which is positioned in the aperture 148' of the valve stem 146'.

The operation of the device 160 to actuate the brake operating device 26 is as follows. The operator of the automobile places his foot on the pedal portion 161' of the lever 161 and pushes it towards the engine compartment thereby swinging the lever 161 about the axis of the shaft 163 away from the brake operating device 26. When the lever 161 is thus moved the valve device 172 moves with it. Due to the lever 161 being able to slightly rock on the sleeve 164 without rotating the sleeve the first portion of the travel of the lever 161 does not rotate the sleeve 164. During this first portion of the travel of the lever 161 as it rocks on the sleeve 164 the valve 180 of the device 172 is retained stationary by the arm 194 of the lever 162 and the valve seat 182 moves out of engagement with the valve head 144' whereupon a partial vacuum is created in the conduits 185 and 187 and in the cylinder 41 whereupon the piston 62 is drawn towards the cap 50.

As the piston 62 moves towards the cap 50 through the medium of the head 103 it swings the lever 162 about the axis of the shaft 163 towards the brake operating device 26 thereby actuating the brake operating arm 26" to operate to apply the brakes 14. As the lever 162 is thus moved after taking up its rocking slack on the sleeve 164 it helps to rotate the sleeve 164 about the axis of the shaft 163 thereby lessening the effort of the operator of the automobile as he applies the brakes.

When the operator releases the pressure on the lever 161 the seat 182 of the device 172 moves into engagement with the valve head 144' thereby breaking the partial vacuum in the conduits 185 and 187 and in the cylinder 41 whereupon the springs 99 and 109 return the piston 62 to its normal position and the spring 171 returns the foot brake lever 161 to its normal position.

From the foregoing description it will be apparent that I have provided a novel vacuum operated device for actuating various mechanisms which is simple in construction and highly efficient in use.

Having thus described my invention, I claim:

1. In a power actuator, a cylinder, a piston movable in said cylinder, a rod, means to universally connect said rod to said piston, a head member, means to adjustably connect the rod to the head member, an arm, means to universally mount the arm on the head member, said head member having a cam surface thereon and means adapted to coact with said cam surface to move the head member and piston.

2. In a power actuator, a cylinder, a piston in said cylinder, a cap on said cylinder, said cap including a concave portion, a head member, means to connect the head member to the piston, a rear member on the cylinder, said rear member having a recess therein, a spring disposed in said recess and engaging said piston, a spring engaging said concave portion and said head member and a boot connecting the cap member and the head member.

3. In a vacuum power actuator for automotive vehicles provided with an internal combustion engine having a throttle controlled suction passage, a cylinder, a conduit communicating at one end with the interior of said cylinder, a valve device, said device including a body portion having a chamber therein, said body having an aperture therein opening into said chamber, said body including a seat portion surrounding said aperture at said chamber end, said body having a passageway therein adapted to be placed in communication with an engine suction passage, said body having a threaded aperture therein opening into said chamber, said body having a third aperture therein opening into said chamber, said conduit communicating with said third aperture and a nut member in said threaded aperture, said nut member having an aperture opening into said chamber, a valve, said valve including a head portion and a shank portion, said valve head being positioned in said chamber and said shank being positioned in said nut aperture, said shank being of less cross sectional area than said nut aperture, said valve head including a seat portion and the inner end of said nut including a coacting seat portion, a coiled spring positioned in said nut member, said spring surrounding said shank and engaging said valve head and said nut, said shank having an aperture therein and a stem in said shank aperture.

4. In a vacuum power actuator for automotive vehicles provided with an internal combustion engine having a throttle controlled suction passage, a cylinder, a conduit communicating at one end with the interior of said cylinder, a valve device, said device including a body portion having a chamber therein, said body having an aperture therein opening into said chamber, said body including a seat portion surrounding said aperture at said chamber end, said body having a passageway therein adapted to be placed in communication with an engine suction passage, said body having a threaded aperture therein opening into said chamber, said body having a third aperture therein opening into said chamber, said conduit communicating with said third aperture and a nut member in said threaded aperture, said nut member having an aperture opening into said chamber, a valve, said valve including a head portion and a shank portion, said valve head being positioned in said chamber and said shank being positioned in said nut aperture, said shank being of less cross sectional area than said nut aperture, said valve head including a seat portion and the inner end of said nut including a coacting seat portion, said valve head having a recess therein, a coiled spring positioned in said valve head recess, said spring surrounding said shank and engaging said nut, said shank having an aperture therein and a stem in said shank aperture, said stem including means adapted to receive an operating arm.

5. In a vacuum power actuator for automotive vehicles provided with an internal combustion engine having a throttle controlled suction passage, a cylinder, a conduit communicating at one end with the interior of said cylinder, a valve device, said device including a body portion having a chamber therein, said body having an aperture therein opening into said chamber, said body including a seat portion surrounding said aperture at said chamber end, said body having a passageway therein adapted to be placed in communication with an engine suction passage, said body having a threaded aperture therein opening into said chamber and coaxial with said first aperture, said body having a third aperture therein opening into said chamber at right angles to said first two apertures, said conduit communicating with said third aperture, a nut member in said threaded aperture, said nut member having an aperture opening into said chamber, a valve, said valve including a head portion and a shank portion, said valve head being positioned in said chamber and said shank being positioned in said nut aperture, said shank being of less cross sectional area than said nut aperture, said valve head including a seat portion and the inner end of said nut including a coacting seat portion, a coiled spring surrounding said shank and engaging said nut, said shank having a threaded aperture therein, a stem threaded into said shank aperture and a lock nut on said stem engaging the outer end of said shank, said stem having an aperture therein adapted to receive an operating arm.

6. In a power actuator, a cylinder, one end of said cylinder being closed, said closed end of said cylinder having a valve chamber thereon communicating with the interior of said cylinder and having an aperture communicating therewith at right angles to the axis of said chamber, a valve member mounted on said piston at the end thereof toward said closed end of said cylinder, said valve member extending from said piston and including a shank portion and an enlarged head portion, said valve when said piston is adjacent the open end of said cylinder being out of said valve chamber and when said piston is at the limit of its travel toward the closed end of said cylinder being positioned in said valve chamber with said annular portion thereof positioned beyond said aperture in the closed end of said cylinder.

7. In a power actuator for a clutch device, a cylinder, one end of said cylinder being closed, said closed end of said cylinder having a valve chamber thereon communicating with the interior of said cylinder and having an aperture communicating therewith, a conduit, one end of said conduit communicating with said cylinder aperture and the opposite end being adapted to communicate with a conduit, a piston in said cylinder, a head member, means connecting said head member and said piston at the end thereof opposite the closed end of said cylinder, means adapted to connect said head member and an actuating means, a valve member mounted on said piston at the end thereof toward said closed end of said cylinder, said valve member extending from said piston and including a shank portion and an enlarged head portion, said valve head including a cylindrical portion, a tapering portion merging into said shank and a tapering portion on the opposite side of said cylindrical portion, said valve when said piston is adjacent the open end of said cylinder being out of said valve chamber and when said piston is at the limit of its travel toward the closed end of said cylinder being positioned in said valve chamber with said annular portion thereof positioned beyond said aperture in the closed end of said cylinder.

8. For use with a vehicle including an internal combustion engine having a suction fuel feed system including a fuel conduit having shut-off means for controlling the passage of fuel to said engine and including a clutch device having operating means to actuate said clutch into and out of engagement, a cylinder, one end of said cylinder being closed, said closed end of said cylinder having a valve chamber thereon communicating with the interior of said cylinder and having an aperture communicating therewith at right angles to the axis of said chamber, a conduit, one end of said conduit communicating with said cylinder aperture and the opposite end being adapted to communicate with a fuel conduit intermediate the shut-off means and the cylinders of an engine, a piston in said cylinder, means to resiliently urge said piston towards the open end of said cylinder, a head member, ball and socket means connecting said head member and said piston at the end thereof opposite the closed end of said cylinder, means adapted to connect said head member and an actuating means, a valve member mounted on said piston at the end thereof toward said closed end of said cylinder, said valve member extending from said piston and including a shank portion and an enlarged head portion, said valve head including a cylindrical portion, a frusto-conical portion merging into said shank and a frusto-conical portion on the opposite side of said cylindrical portion, said valve when said piston is adjacent the open end of said cylinder being out of said valve chamber and when said piston is at the limit of its travel toward the closed end of said cylinder being positioned in said valve chamber with said annular portion thereof positioned beyond said aperture in the closed end of said cylinder.

9. In a vacuum power actuator for automotive vehicles provided with an internal combustion engine having a controlled suction passage, a cylinder, a conduit communicating at one end with the interior of said cylinder, a valve device, said device including a body portion having a chamber therein, said body having an aperture therein opening into said chamber, said body having a passageway therein in communication with the engine suction passage, said passageway communicating with said chamber, said body having a recess opening into said chamber and open to the atmosphere, said body having a second aperture therein opening into said chamber, said conduit communicating with said third aperture, a valve including a head portion in said chamber and a shank portion in said recess, means engaged by said valve to control passage between said first aperture and the chamber, said valve including a portion adapted to close communication through the recess between the chamber and the atmosphere, resilient means in said recess and engaging said valve to normally urge said valve in one direction to a position to prevent flow through said first aperture and other means to move the valve in a reverse direction.

10. In a vacuum power actuator for automotive vehicles provided with an internal combustion engine having a controlled suction passage, a cylinder, a conduit communicating at one end with the interior of said cylinder, a valve device, said device including a body portion having a chamber therein, said body having an aperture therein opening into said chamber, said body having a passageway therein in communication with the engine suction passage, said passageway communicating with said chamber, said body having a recess opening into said chamber and open to the atmosphere, said body having a second aperture therein opening into said chamber, said conduit communicating with said third aperture, a valve including a head portion in said chamber and a shank portion in said recess, means engaged by said valve to control passage between said first aperture and the chamber, said valve including a portion adapted to close communication through the recess between the chamber and the atmosphere, a stem in said valve, resilient means in said recess and about the valve stem and engaging said valve to move it in one direction, means to adjust said resilient means to vary the pressure on the valve and other means to move the valve in a reverse direction.

McKINLEY PALMER.